Oct. 30, 1956 J. A. CUNNINGHAM 2,769,164
MULTICHANNEL PULSE-HEIGHT ANALYZER
Filed July 30, 1954 3 Sheets-Sheet 1
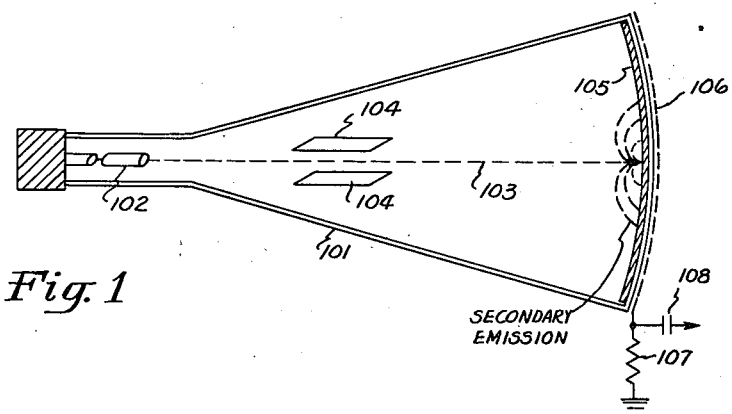
Fig. 1
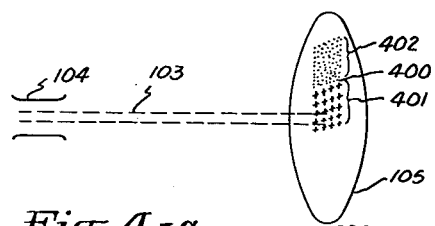
Fig. 4-a
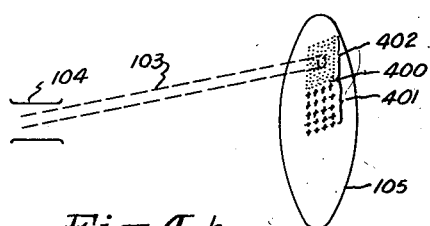
Fig. 4-b
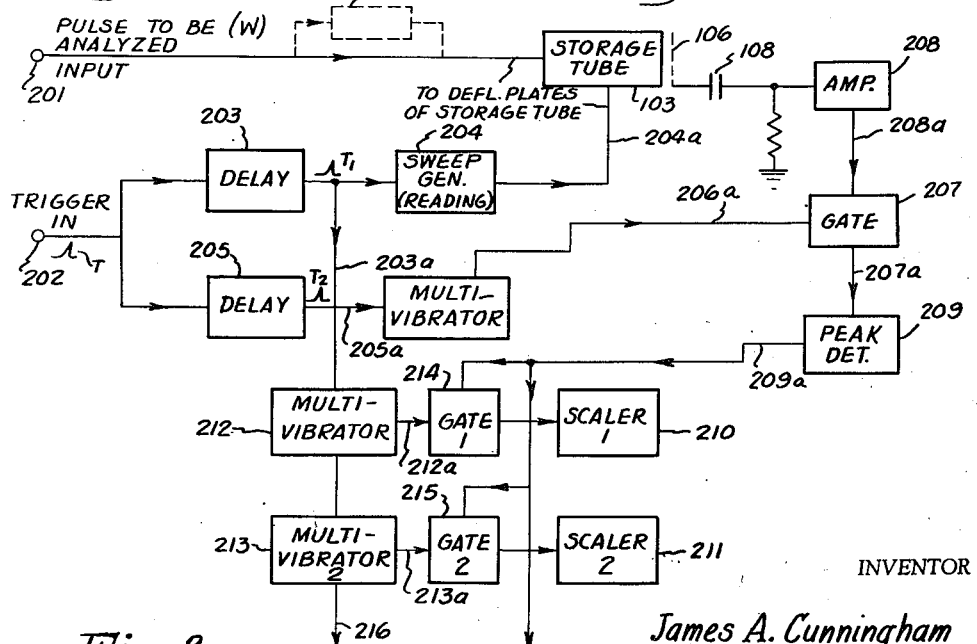
Fig. 2
INVENTOR
James A. Cunningham
BY Arthur Vinograd
ATTORNEY Oct. 30, 1956   J. A. CUNNINGHAM   2,769,164
MULTICHANNEL PULSE-HEIGHT ANALYZER
Filed July 30, 1954   3 Sheets-Sheet 3
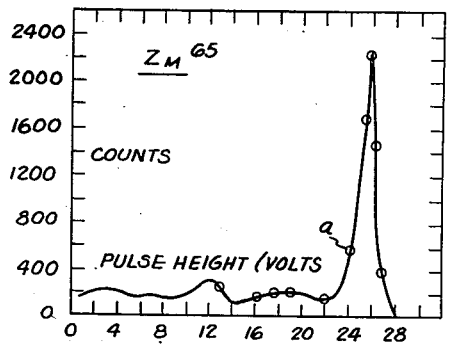
Fig. 7
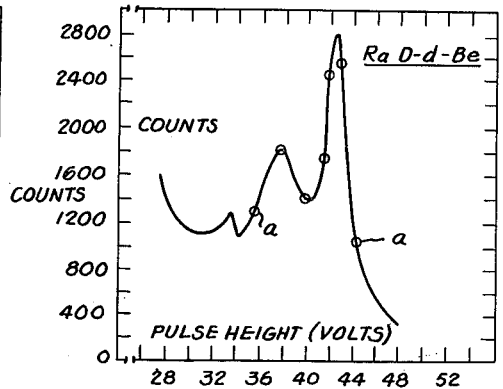
Fig. 8
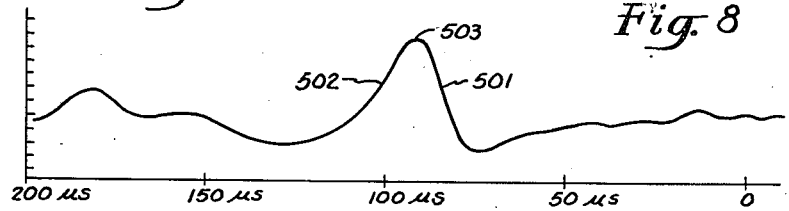
Fig. 5
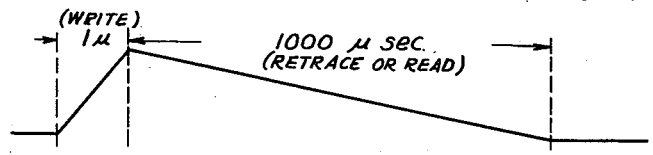
Fig. 6-a
Fig. 6-b
Fig. 6-c
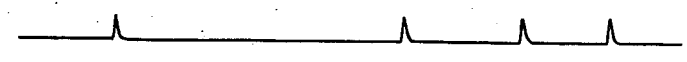
Fig. 6-d
INVENTOR
James A. Cunningham
BY Arthur Vinograd
ATTORNEY United States Patent Office 2,769,164
Patented Oct. 30, 1956

2,769,164

MULTICHANNEL PULSE-HEIGHT ANALYZER

James A. Cunningham, Wheaton, Md., assignor to the United States of America as represented by the Secretary of Commerce Application July 30, 1954, Serial No. 446,985

12 Claims. (Cl. 340—212)

This invention relates to a multichannel pulse-height analyzer and is particularly adapted to analyze voltage pulses such as are encountered in investigations involving the use of high velocity particle accelerators such as the Betatron or Synchrotron. Since such pulses are obtained during the short output duration of the accelerator, it has been found efficacious to memorize such voltage pulses and then analyze them during the dead time period between the output periods of the accelerator. The invention however, is not necessarily limited for use in connection with the outputs obtained from high energy particle accelerators since the construction of the analyzer involves principles which singularly adapt it for use in analyzing pulses obtained from any desired source.

It is therefore an object of this invention to provide a pulse height analyzer which will memorize the output signals obtained from a high velocity particle accelerator during its active period and which is adapted to analyze the amplitude and occurrences of these signals in the dead time intervals which occur between active output periods.

Another object of this invention is to provide a pulse analyzer which will convert the amplitude of an applied pulse into a measurable time interval so that the measured interval will serve as an indication of the magnitude of the analyzed pulse.

A further object of this invention is to provide means for recording or tabulating the analyzed results into groups of voltage amplitude categories.

Further objects will be made apparent from the following descriptions together with the accompanying drawings in which:

Figure 1 represents a cathode-ray tube modified according to the present invention;

Figure 2 is a block diagram showing the arrangement of the circuit employed with the cathode ray tube;

Figures 4a and 4b are enlarged views showing the principle involved in storing and reading pulses to be analyzed;

Figure 5 shows a typical voltage pulse with which this invention is concerned.

Figures 6a–6d illustrate certain wave forms explaining a modified use of the invention, and Figures 7 and 8 show experimentally obtained data using the present invention.

Figure 3:
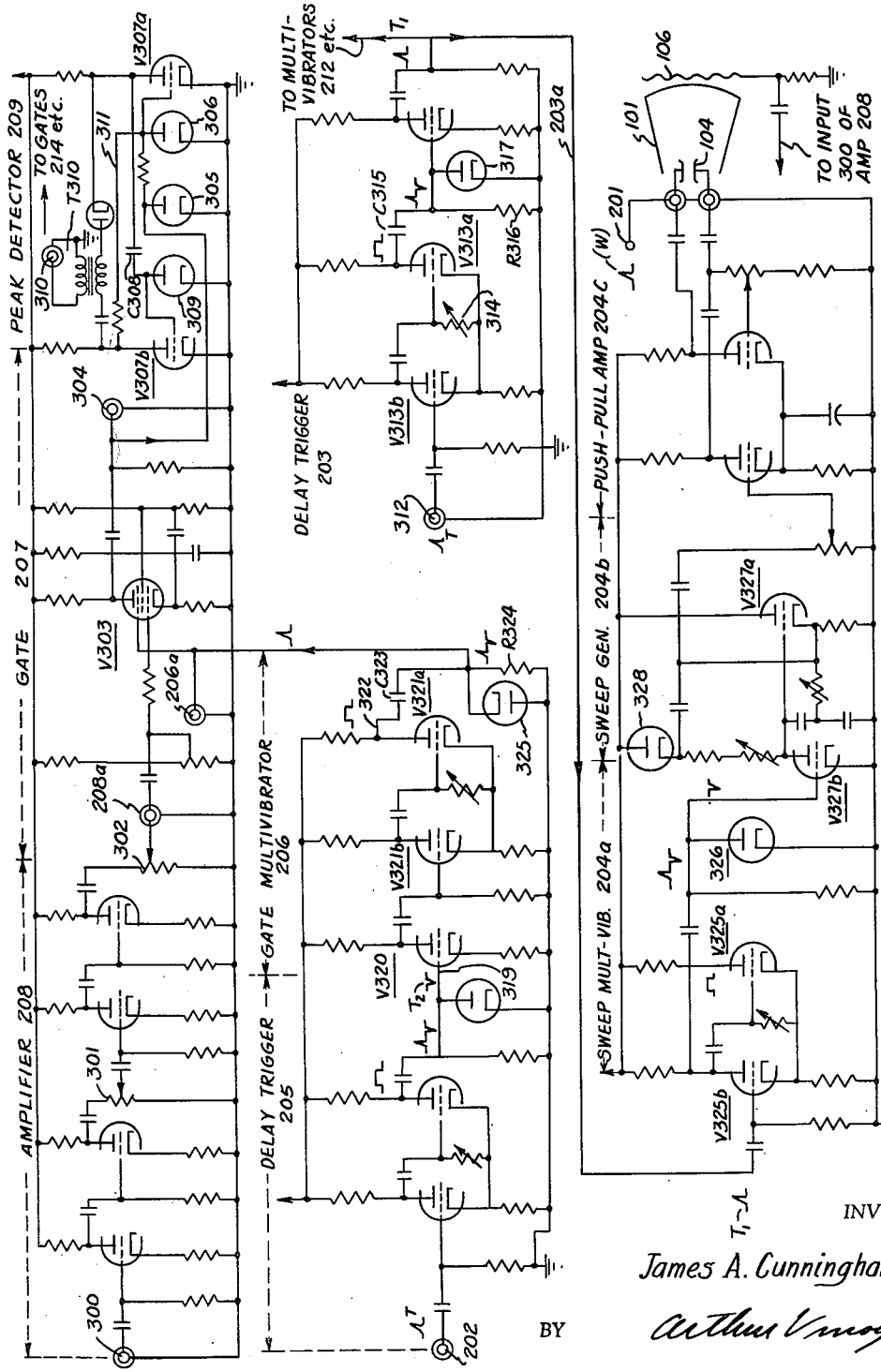
Figure 3 shows the circuit details and components comprising the diagrammatic illustration of Figure 2.

The analyzer utilizes a technique of storing the voltage pulses during the short output duration of the accelerator and then analyzing the information during the dead time. The pulse heights are converted into time intervals by means of a cathode ray tube which is suitably modified for use in an information-storage device so that the time of arrival of an output pulse is proportional to the amplitude of the applied input pulse. By the use of a series of suitable time gates to measure such time intervals, a relatively simple and compact multi-channel analyzer is achieved.

Since much of the research in nuclear physics involves the measurement of voltage pulse heights obtained from a suitable detector, many pulse height analyzers have been developed. Typical analyzers employ the principle of electronic voltage discrimination, the deflection of an electron beam in a cathode ray tube or by electric sweep comparison methods which change a pulse height into a time interval. The pulse height analyzer comprising this invention employs features engendering the last two described principles.

*Cathode-ray-tube storage technique*

The operation of the pulse height analyzer, comprising this invention is derived from the singular operation of a storage device such as a cathode-ray tube.

As shown in Figure 1, the storage tube 101 is of conventional construction and comprises an evacuated envelope containing an electron gun 102 from which emanates an electron beam 103. A pair of deflection plates 104—104 are shown to which suitable voltage pairs may be applied to deflect the beam. The inside face of the tube is provided with a conventional phosphor coating 105, while an additional signal pick-up electrode in the form of a wire grid, screen, or foil 106 is placed on the outside face of the tube whereby capacitive coupling between the storage layer 105 and the screen 106 may be obtained.

The screen 106 is connected to ground potential through resistor 107 and voltage signals developed across such resistor may be applied to a utilization circuit through capacitor 108.

The storage process characterizing tubes of the type shown in Figure 1 is based on the principle of secondary emission as is well known. When the electron beam strikes the phosphor surface 105, secondary electrons are emitted from the phosphor at the beam position. Such portion of the surface becomes positively charged consequent to the loss of the electrons.

The emitted electrons fall on the area immediately surrounding the beam position, charging it to a negative potential. Such secondary electron emission continues until the phosphor surface struck by the beam is charged positive.

The pulse to be analyzed is applied to the deflection plates 104 by means to be described and the electron beam 103 is thereby deflected across the face of the tube for the duration of the pulse and then returns to normal position.

Since the area bombarded by the beam during such sweep period will be charged positively with respect to the surrounding area, the subsequent application of a controlled sweep voltage to the deflecting plates 104 can be employed to sweep the beam across an area including the same path produced by the previously applied pulse and thereby read or sense the condition of charge of the previously swept area.

However, if the area swept by the beam under the controlled sweep voltage is made greater than that produced by the original pulse, the beam will impinge against a previously uncharged region of the phosphor, and secondary electrons will be emitted for the duration of such previously unswept area. Such action will be apparent by reference to Figures 4a and 4b.

In Figure 4a the area of the phosphor screen 105 swept by electron beam 103 in response to the pulse to be analyzed, or the "write" pulse, is designated by reference numeral 401 and such area is further illustrated in the drawing as being at a positive potential. The subsequent application of a controlled sweep voltage corresponding to the reading pulse to the deflection plates 104 deflects electron beam 103 through a path including both the positively charged area 401 and an additional area 402. The potential gradient between these areas is abrupt as the scanning beam passes the boundary line 400 shown in Figures 4a and 4b. In other words when the beam 103 is deflected by a reading pulse it will scan first the area 401 which has previously been charged to a positive potential and then the area 402, secondary electron emission being initiated from the area 402 as soon as beam 103 passes the boundary line 400 and continuing for the balance of the duration of the reading sweep. Since some of these electrons fall on the normally grounded coating 105 of the tube, the average potential of the phosphor becomes positive while the beam scans the area 402 and an output signal will be generated across resistor 107 (Figure 1). The beam thereby reads the previously stored information by thus discriminating between the potentials sensed in areas 401 and 402, respectively.

The time at which the output across resistor 107 is manifested as measured from the initiation of the reading sweep is therefore proportional to the peak voltage of the previously applied write pulse because the referred-to output signal is obtained at the time beam 103 traverses boundary line 400.

Figure 5 shows a typical output signal as generated across resistor 107 taken from an oscilloscope and plotted on a time scale in microseconds. The output signal is apparent at the 100-microsecond position, the remaining ripples being caused by background effects. It will be noted that the pulse shown in Figure 5 includes a positively increasing slope portion 501, a negative slope portion 502 and a peak portion 503. Such characteristics of the output signal are utilized by the peak detector 209, later to be described, in order to determine the occurrence of the voltage peak 503. It is apparent from Figure 5 that, in accordance with the theory discussed in connection with Figures 4a–5b, the appearance of the output signal peak 503 at a 100-microsecond time interval, corresponds with the passage of the electron beam 103 (Figures 4a, 4b) across the boundary line 400 between the differently charged areas 401, 402. Since the vertical extent of the area 401 is proportional to the amplitude of the W pulse to be analyzed, it follows that if the rate of deflection of electron beam 103 during a reading operation is measured and plotted against time as represented by the abscissa in Figure 5, then the time of occurrence of the output signal peak 503 must be proportional to the amplitude of the inscribed pulse W. The means for correlating the sensed pulse peak 503 with the time scale representing the displacement of the electron beam during a reading scan will be described in connection with the description of the pulse height analyzer circuits. However, in order to crystallize at this point in the description the manner of obtaining such result it may be briefly mentioned that peak detector 209 (Figure 2) senses the occurrence of such a pulse peak (Figure 5) while the series of multivibrators 212, 213, etc. being triggered in time sequence by a triggering pulse $T_1$, occurring at the instant after a W pulse has been inscribed, provide a calibrated time base scale which together with an associated gate such as 214 marks the concurrence of the peak of the output signal 503 with a particular measured time interval. Such correlated information can either be recorded, registered by a suitable indicator, such as an oscilloscope, or tabulated by a scaling device such as 210 or 211 which is associated with each of the interval sequence multivibrators 212, 213, etc., respectively.

The writing sweep is generally of very short duration (3 millimicroseconds) while the reading sweep can be made relatively long (i. e., a duration of 1,000 microseconds).

In the event two or more writing sweeps are applied to the storage tube, a corresponding number of the described phosphor discontinuities will be created and, upon subsequent application of the reading sweep, each such discontinuity will result in an output pulse across resistor 107. As in the case of a single applied pulse, the time of occurrence of each such output pulse, respectively, will be proportional to the height of the corresponding applied input pulse. The apparatus is, in fact, singularly adapted to handle a multiple pulse situation because the duration of the reading sweep may be for 1000 microseconds as compared to the 3 millimicrosecond periods during which the writing pulses are applied. The output pulses read during such 1000-microsecond period after the start of the read sweep are therefore distributed into discrete groupings with respect to time.

Pulse height analyzer circuits

In order to obtain the described sequential application of read and write pulses to the storage tube a timing and gating circuit of the type schematically shown in Figure 2 is employed. The circuit construction of each element shown in such block diagram is further detailed in Figure 3.

Referring to Figure 2 the over-all operation of the analyzing circuit can be briefly explained.

The writing pulse W to be analyzed is applied to the deflection plates of the storage tube 103 at a first input and causes the described write deflection of the electron beam. Following such writing action, it is necessary to generate a subsequent sweep voltage to produce the described reading sweep. As shown in Figure 2, the application to a second input 202, of a trigger pulse T which occurs virtually simultaneously with the pulse W to be analyzed, if delayed by a definite time interval before being applied to the deflection plate of storage tube 101 will produce such desired result. In actual practice the trigger pulse T employed may comprise the ejection pulse emitted by the Betatron a few microseconds before the X-ray burst occurs. However, for other applications, such trigger pulses could be derived coincidentally with the pulse W to be analyzed, or could in fact comprise the W pulse.

The trigger pulse T is therefore applied to delay element 203 and emerges as a secondary trigger pulse $T_1$, time delayed with respect to pulse T. The secondary trigger pulse $T_1$ is then applied to sweep generator 204 and initiates the referred-to read sweep voltage which is applied to the deflecting plates of storage tube 101 and thereby initiates the reading sweep of the electron beam at a time subsequent to the write sweep.

The same trigger pulse T is applied to a second delay element 205 which also generates a secondary trigger pulse $T_2$ and is applied through conductor 205a to a multivibrator 206. Multivibrator 206 is connected by lead 206a to a gate 207 and, when triggered by pulse $T_2$, controls the conduction of the gate.

As was described in connection with the operation of the storage tube, an output voltage signal is obtained across resistor 107 as the result of a reading sweep and such voltage signal is amplified in amplifier 208 and is applied through conductor 208a to gate 207. The gate 207 also applies additional amplification to the signal and transmits the amplified signal to a peak detector 209.

Gate 207 is provided in order to eliminate the interference effects of spurious signals emanating from storage tube 101 when the original writing pulse W is applied thereto. Such signals are indicated as ripples adjacent to the main pulse 503 in Figure 5. Since gate 207 can only transmit a signal obtained from the screen on the face of the storage tube at a time determined by the output of multivibrator 206, and since the multivibrator in turn is energized by the delayed secondary trigger pulse $T_2$, it follows that gate 207 can conduct only during the reading-sweep cycle and will be cut off during the write cycle. Delay 205 is chosen so that the delay period for trigger pulse $T_2$ is slightly greater than that for pulse $T_1$. Because of such greater delay period, gate 207 will not conduct any of the unwanted output signals which may be read by the pick-up at the initiation of the read sweep.

The above-described portion of the circuitry symbolized in Figure 2 therefore provides a means for applying a reading sweep to storage tube 101 sequentially after a write sweep has been initiated and for insuring that the read signal is a function only of the pulse to be analyzed.

The remaining portion of the diagram shown in Figure 2 includes elements enabling the read pulses as above obtained to be suitably analyzed as by time-sequence compilation.

Such compilation may readily be accomplished by employing the referred-to secondary trigger pulse T₁ to gate a number of time-period compilation channels, such as are represented by two scalers 210 and 211 shown in Figure 2.

The delayed pulse T₁ is applied sequentially through lead 203a to a sequence of cascaded multivibrators, only two of which, 212, 213, are shown. The outputs 212a, 213a, from these multivibrators are applied to a pair of gates 214, 215, paralleled to each of the multivibrators, respectively, in time sequence.

The output from peak detector 209, which, as above described, corresponds to the read voltage obtained from storage tube 101, is applied in parallel through conductor 209a to gates 214 and 215 simultaneously. The outputs from each of the gates may be applied to any conventional tallying device such as, for example, the scalers 210, 211, which are shown connected to each of the gates, respectively. The signal from peak detector 209 is applied simultaneously to gates 214 and 215, but, as will appear, the gates 214 and 215 will be caused to conduct one after the other in time sequence and only that gate which is opened at a particular instant will conduct a pulse to its respective scaling device.

The trigger pulse T₁ will initiate multivibrators 212 and 213 in time sequence. That is, multivibrator 212 will be energized before multivibrator 213, etc., and will bias gate 214 so that if a signal pulse is then present at peak detector output 209a, gate 214 will conduct and the output will be stored in scaler 210. Subsequent energization of multivibrator 213 similarly biases gate 215 so that pulses will be stored in scaler 211. The scalers 210, 211, may be of conventional construction, such as is described, for example, in pages 81–111 of Phillips Research Report 7 of April 1, 1952. The multivibrators and gates will be further explained following the circuit description of Figure 3.

While only two compilation channels have been illustrated in connection with Figure 2, the circuit is such as to permit the ready addition of as many additional channels as is desired. It is merely necessary to cascade additional multivibrators to point 216 and parallel a like number of gate-scaler units to the output lead 209a of the peak detector.

While the block diagram shown in Figure 2 can be readily implemented by employing for the most part conventional circuits for the various components designated by the labeled blocks, a complete circuit diagram is illustrated in Figure 3 as being representative of one embodiment of the analyzing circuitry employed. The reference numerals employed in Figure 2 are used to designate like elements in Figure 3.

Amplifier 208

Amplifier 208 is a conventional voltage amplifier employing a pair of twin triodes such as 12AU7's connected in cascade as shown. Potentiometer 301 provides a means for controlling the amount of amplification, and the output signal is obtained across an adjustable potentiometer 302 from which it is applied through lead 208a to the input of a gate 207. As indicated in Figure 3, the output signal obtained from pick-up electrode 106 is applied to input 300 of amplifier 208.

Gate 207

The gate circuit for 207 shown in Figure 3 has two inputs 208a and 206a corresponding to like points in Figure 2. Gating operation is obtained in a conventional manner by applying the flat-topped pulse obtained from a multivibrator 206 to one of the grids of the multiple grid tube V303 which is of the 6AS6 type. The pulse from amplifier 208 is applied through 208a to a second grid of tube V303 as shown. The circuit parameters are so chosen that tube V303 is normally at cut-off despite the presence of a signal on either grid, but will conduct upon concurrent energization of both grids to deliver an output signal at 304 which is applied through lead 304a to the input of peak detector 209.

Peak detector 209

The peak detector 209 is a special voltage-peak-locating circuit which employs the principle of discriminating between the rising and falling slopes 501 and 502 of a pulse as shown in Figure 5 and thereby senses the peak value 503. The peak detector employed is similar to that disclosed in copending application, Serial No. 479,690, filed on January 3, 1955, by Edward R. Saunders, which is assigned to the assignee of this application.

Briefly, the voltage pulse obtained from the pick-up plate 106 (Figure 1) is shown in Figure 5, and includes rising and falling slope portions 501, 502, respectively. As is evident from Figure 3, such pulse is inverted when applied to input 304 of peak detector 209. Accordingly, the signal corresponding to portion 501 drives V307a to cut-off and a positive pulse is obtained from the plate and charges C308. Clamp diode 309 maintains the grid of V307b at a constant potential during such charging period and hence the plate voltage at V307b is held constant for a like period. In other words, during the portion of the input signal corresponding to slope 501, the output from V307b is constant and no significant output is obtained from the secondary of output transformer of T310.

When the polarity of the slope (corresponding to slope 502, Figure 5) of the input signal changes, V307a starts to conduct, driving the grid of V307b in a negative direction, since it is now unclamped by diode 309. The resulting rapid increase in the plate voltage of V307b which is enhanced by the feedback applied through 311 to the grid of V307a is manifested in the secondary of T310 as an output pulse representing the peak value of the voltage signal sensed by 106. The output signal is obtained from point 310 and is applied to all of the gates 214, etc. in parallel as shown in the block diagram of Figure 2.

Trigger delay 203

The delay trigger 203 has an input 312 for receiving the triggering pulse T referred to in Figure 2 and delivers an output in the form of a delayed secondary trigger pulse T₁ to output lead 203a. The delay is obtained by employing a one-shot multivibrator circuit including the twin triodes V313a, V313b. The construction and operation of such circuits are well known and are described, for example, in "Radio Engineering," by F. E. Terman (3d edition) on pages 590–591. The application of a sharp trigger pulse T to the grid of V313b results in a square wave output obtained from the plate of V313a. The duration of the output may be adjusted by potentiometer 314. It will be appreciated that the time interval between the leading and trailing edges of the square wave output can be used as a delay function. Such effect is accomplished by differentiating the square wave output through C315 and R316 to produce sharp positive and negative pulses corresponding respectively to the leading and trailing edges of the square wave. Diode 317 then, by clamping action, selects only the negative pulse, which, since it occurs at a time interval occurring after the positive pulse, represents a time-delayed trigger pulse T₁, as identified in Figure 2. The delayed triggering pulse T₁ obtained as an output from delay trigger 203 is applied through conductor 203a both to the input of sweep multivibrator 204a and to the series of multivibrators 212, 213, etc., shown in Figure 2, comprising the time calibrated signal source. The latter multivibrators are not shown in Figure 3.

Delay trigger 205

The same trigger pulse T is simultaneously applied at input 202 of delay trigger 205. Trigger 205 is identical in construction to trigger 203, already described, and produces a delayed trigger pulse T2 at the input 319 of gate multivibrator 206.

Gate multivibrator 206

The purpose of gate multivibrator 206 is to cause the described gate 207 to conduct only during a reading sweep of the electron beam and only when a signal corresponding to the main signal of Figure 5 has been sensed. Since the delayed trigger pulse T2 follows trigger pulse T which, as already described, occurs virtually simultaneously with the W pulse to be analyzed, multivibrator 206 will allow gate 207 to conduct only at such time, and thereby passage of any unwanted sensed signals is prevented.

Accordingly, the delayed trigger pulse T2 of negative polarity is applied to phase inverter V320 and the inverted pulse is applied to the input of a multivibrator comprising the twin triodes V321a, V321b. Such multivibrator is of the same type described in connection with delay trigger 205. The square wave output obtained at 322 is also differentiated by C323 and R324, and diode 325 in this instance permits only the positive pulse corresponding to the leading edge of the square wave to be applied to input 206a of the gate 207 already described.

Cathode-ray-tube deflecting circuit

As is evident from the block diagram of Figure 2 and the discussion of Figures 4a and 4b, the deflection circuit comprising sweep generator 204 functions to (1) deflect the electron beam over a path corresponding to 401 (Figure 4) when writing or storing a W pulse to be analyzed and (2) deflect such electron beam over both paths 401 and 402 when sensing or reading the stored pulse. The sweep generator 204 includes sweep multivibrator 204a, sweep generator 204b and push-pull amplifier 204c all of which are detailed at the bottom of Figure 3.

The delayed trigger pulse T1 obtained from delay trigger 203 is applied by line 203a to the input of sweep multivibrator 204a. Sweep multivibrator 204a includes a pair of triggering triodes V325a, V325b, of the type already described. The square wave output obtained from V325a is differentiated by the R—C circuit and diode 326 clamps the positive differentiated pulse to ground and therefore allows only the negative pulse corresponding to the trailing edge of the square wave to be applied to the input of V327b of sweep generator 204b.

The circuit comprising tubes V327a, V327b, and diode 328, constitutes a saw-tooth generator of the feedback type which is fully described on pages 72–74 of "Electronics" by W. C. Elmore and Matthew Sands, published by McGraw-Hill in 1949. Such sweep generator has excellent linear characteristics and produces an output sweep voltage when triggered by the pulse applied to the grid of V327b. The output obtained from cathode follower V327a is applied to the deflection plates 104 of tube 101 through a suitable push-pull amplifier 204c.

Time calibrating and compilation circuits

The details of the multivibrators 212, 213, gates 214, 215, and scalers 210, 211, shown in Figure 2, are not illustrated in Figure 3. The points from which the signals are taken from peak detector 209 and trigger delay 203 for application to the multivibrators and gates are clearly indicated in Figure 2. The multivibrators 212, 213, etc. are conventional and are similar in construction and operation to the described gate multivibrator 206. These multivibrators are characterized by a square wave output when conduction is initiated by the application of a triggering pulse T1 to the inputs thereof. As shown in Figure 2 multivibrator 212 is the first to conduct and a square wave pulse is obtained on output 212a when multivibrator 212 is initiated by pulse T1 and, accordingly, gate 214 is biased toward conduction for the duration of such square wave output. If during such interval, an output should be obtained from peak detector 209, the gating action is completed and a signal will be applied to the associated compilation scaler 210 only.

The duration of the square wave output from multivibrator 212 is determined by the design of its circuit components as is well known and the duration is selected to conform with a time interval representing a chosen fraction of, for example, a 100-microsecond period in this case.

Upon cessation of such square wave output, the negative-going trailing edge of the output wave is caused to initiate, in sequence, conduction of a second multivibrator 213 which, too, produces a square wave output on 213a and will consequently bias gate 215 toward conduction immediately after gate 214 has been rendered nonconducting. Thus gate 215 is now conditioned to deliver an output signal to an associated scaling device 211 upon receipt of a signal from peak detector 209.

By such technique, as many additional multivibrators as are required may be added at point 216 (Figure 2) in order to obtain a desired number of time divisions or calibration points for compilation purposes. Each multivibrator is triggered one after the other in time sequence, and, therefore, initiates a series of sequential time-controlled output signals corresponding to a calibrated time base scale with which the outputs from peak detector 209 may be compared. It follows also, that such time scale as generated by the referred-to multivibrator action is the same as the time scale governing the displacement of the electron beam during a reading sweep.

Summary of operation

By way of summary, the over-all operation of the analyzing device illustrated in Figures 2 and 3 will be reviewed. The pulse to be analyzed is applied at the first input 201 (Figures 2 and 3) to the deflection plates 104 of storage tube 101 and results in the writing of a storage charge corresponding to the positively charged area 401, shown in Figures 4a, 4b.

Immediately following such storing operation a trigger pulse T is applied to the second input 202 as shown in Figure 3 or 4. The source of such triggering pulse is optional. When the apparatus is used to analyze the X-ray burst in a high-voltage accelerator such as a Betatron the trigger pulse preferably employed is the ejection pulse that precedes the X-ray burst by a few microseconds. When the apparatus is used for random pulse analysis, the trigger pulse may be identical with the pulse to be analyzed.

Such triggering pulse is employed to (1) initiate the reading sweep of the electron beam 103 immediately following the writing sweep; (2) to gate the output from reading amplifier 208 in the described manner so as to prevent passage of unwanted signals to peak detector 209 and permit passage of only the significant pulse peak 503 (Figure 5); (3) initiate the time sequence devices 212, 213, etc. so as to calibrate the output from peak detector 209 on a time base in the described manner. These three functions are accomplished in the following manner.

The delayed trigger pulse T1 obtained from trigger delay 203 initiates the reading sweep generator 204 which deflects the electron beam 103 over the areas 401 and 402 (Figure 4b). The same trigger pulse T1 concurrently initiates in sequence the associated time-measuring multivibrators 212, 213, etc., each of which, when energized, applies one input signal to a respective coincidence gate 214, 215, etc. The output signal from peak detector 209, which represents the result of reading the previously stored W-pulse is applied in common to all of the coincidence gates 214, etc., in parallel. The energization of each multivibrator respectively corresponds to a subsequent period of time with respect to the zero period represented by pulse $T_1$. The signal output from peak detector 209 will occur at a period of time (measured on the same time scale) proportional to both the displacement of electron beam 103 and the extent of the area 401 (Figure 4b) in other words, the time interval when the beam crosses line 400 denoting a phosphor potential discontinuity. It follows that only a coincidence gate which is currently energized at such time period will conduct to the appropriate recording or compilation device 210, etc.

As previously noted, a second delayed trigger pulse $T_2$ initiates gate 207 at a time interval corresponding to the occurrence of the pulse to be analyzed, such gate otherwise blocks spurious signals obtained from the pick-up 106 during the writing sweep and which may also occur during the periods of the reading sweep preceding and following the occurrence of the signal 501—503 (Figure 5) representing detection of the referred-to phosphor potential discontinuity.

Since the pulse to be analyzed is applied to a single set of deflection plates according to a preferred embodiment of the invention only the peak of the pulse will form a phosphor potential discontinuity, thus obviating the need of an input pulse-shaping network. Pulses of 3 millimicrosecond durations have been successfully analyzed. Moreover, it has been found that several pulses can be stored on the storage surface 105 prior to the application of a reading sweep. This enables the analyzer to accept several pulses during a short X-ray burst, permitting an increase in the rate at which data can be taken.

In other words, the present invention is not limited to single pulse analyzation. For example, when the analyzer is used to examine the spectrum of a source emitting particles at random times a suitable gate indicated at 230 in Figure 2 is employed at input 201. A linear differential amplifier type of gate such as that described by P. R. Chagnon in Rev. Sc. Instr., vol. 24, p. 990 (1953) has been found satisfactory for such purpose. When so employed, the gate is opened, allowing a few pulses to enter the storage tube 101, and then closed during the reading sweep, the action of which is the same as has been described. Of the plurality of pulses so admitted, each produces an individual signature on the storage surface as a store area in the form of a respective phosphor potential discontinuity. Each such discontinuity is manifested as an output signal when the areas are swept by the electron beam during a reading operation. During such reading sweep, the electron beam in crossing the discontinuities created as a result of the various stored pulses will manifest output signals on the pick-up electrode on the same basis as described in connection with Figures 4a and 4b, and such signals are then analyzed and compiled in the same manner as described in connection with Figures 2 and 3.

Figures 7 and 8 illustrate actual results obtained by the present analyzer. The curves show the analyses obtained experimentally by measurement and computation for the gamma ray spectra of two radioactive sources as indicated, while the small circles $a$ plotted on the curve show the values automatically obtained and compiled by the apparatus of this invention.

The resolution of the pulse height analyzer can be defined as the ratio of the uncertainty in the pulse height measurement to the maximum pulse height that can be analyzed. The resolution of this pulse height analyzer is determined by the storage tube, the peak detector, and the time gates.

Since the time of the output signal of the storage tube occurs as a smoothly varying function of the pulse height, the resolution of the cathode-ray tube can be determined by observing the time duration of the output signal. The expected output signal rise time depends upon the speed of the reading sweep, the sharpness of the reading sweep beam, and the sharpness of the phosphor potential discontinuity. The phosphor potential discontinuity (400, Figures 4a, 4b) is created by the edge of the primary electron beam; and, therefore, it depends on the sharpness of the beam. Assuming that the beam spot size is of the order 0.020" ÷ (reading sweep in in./sec.), then with the 1400 microsecond 2-inch sweep used, the rise time should be approximately 14 microseconds. The decay time of the output pulse is determined by the coupling RC time constant. The capacity between the phosphor 105 and the pick-up electrode 106 is approximately 20 micro-microfarads and the R is 1 meg, so the delay time will be about 20 microseconds. Figure 5 shows the output pulse on a 200 microsecond time base, which appears to be about 40 microseconds out of a 1400 microsecond reading sweep. This compares favorably with the sum of the rise and fall time expected, which is about 35 microseconds.

The principle of operation of the present device is also susceptible of application to other nucleonic instrumentation problems. According to one adaptation the analyzer can be used as a pulse recorder. By employing a conventional switching arrangement, a sweep voltage of the characteristics shown in Figure 6a is applied to the horizontal deflection elements of a storage tube by sweep generator 104 while the voltage pulses to be counted (Figure 6b) are applied to the vertical deflection plates. As a result of the horizontal deflection voltage, the applied voltage pulses will be shown distributed across the face of the storage tube according to the pattern shown in Figure 6c and a charged area of the described characteristics will be created on the storage surface 105 in the region of each such pulse. The sweep voltage shown in Figure 6a includes a writing sweep portion of very short duration and a 1000-microsecond retrace portion. During such retrace of the writing sweep, which occurs during a relatively long time interval as compared with the 1 microsecond signal-storing sweep, the electron beam will scan from right to left along the same base line traced by the beam during the writing operation. As the electron beam now crosses the discontinuities of the phosphor potential created at the base portions of the voltage pulses (Figure 6c) due to such charged areas, corresponding output pulses are obtained as shown in Figure 6d which are manifested in the pick-up electrode. The voltage pulses are therefore stored during a 1-microsecond interval and are then easily measured during the 1000-microsecond retrace time.

The described principles of quick storage and leisurely analysis of data permits the use of simple electronic equipment for the solution of many of the difficult problems involved in nucleonic instrumentation.

While a specific embodiment of the invention has been shown and described in Figures 2 and 3, the basic concept may obviously be implemented in a variety of forms as will readily be understood by those skilled in the art. It is therefore not intended to limit this invention to the particular embodiment shown except as defined by the appended claims.

What is claimed is:

1. A pulse height analyzer, comprising an electron beam storage tube including a beam deflecting means, a charge storing phosphor surface and a pick-up electrode, means for storing the pulse to be analyzed on said storage surface as a charged area the extent of which is proportional to the amplitude of said pulse, means for measuring the magnitude of said store area comprising means for deflecting said electron beam over an area on said surface congruent with said store area and greater than the extent of said store area to create a phosphor potential discontinuity manifestable as a signal on said pick-up electrode, means for detecting said signal, and means for representing said signal as a function of the time period measured from the initiation of said reading sweep.

2. A pulse height analyzer, comprising an electron beam storage tube including a beam deflecting means, a charge-storing phosphor surface and a pick-up electrode, means for storing the pulse to be analyzed on said storage surface as a charged area the extent of which is proportional to the amplitude of said pulse, means for measuring the magnitude of said store area comprising means for deflecting said electron beam to scan an area on said surface congruent with said store area and greater than the extent of said store area to create a phosphor potential discontinuity manifestable as a signal on said pick-up electrode, means for sensing said signal and means for correlating the sensed signal with a time scale representing the displacement of the electron beam during said reading scan.

3. A pulse height analyzer, comprising an electron beam storage tube including a beam deflecting means, a chargeable storage surface and a pick-up electrode, means for storing the pulse to be analyzed on said surface as a charged area the extent of which is proportional to the amplitude of said pulse; means for measuring the magnitude of said store area comprising means for deflecting the electron beam to scan an area on said surface congruent with said store area and greater than the extent of said store area to create a phosphor potential discontinuity manifestable as a signal on said pick-up electrode, means for detecting said signal as a function of the time period measured from the initiation of said reading sweep, a time calibration circuit providing time sequence periodic output signals, means for activating said time calibration circuit concurrently with initiation of said reading sweep and coincidence means connected to said detecting means and energizable only upon occurrence of one of said time signals and the output of said detecting means.

4. An analyzing device in accordance with claim 3 in which said coincidence means comprises a plurality of coincidence gates, means for connecting each of said gates to the output of said signal-detecting means, and means for applying said time sequence periodic output signals sequentially to each coincidence gate, respectively.

5. A pulse-height analyzer comprising an electron beam storage tube of the type including a charge-storing phosphor surface, beam deflecting means and a pick-up electrode, a first circuit for applying said pulse to be analyzed to said deflecting means to produce deflection of the electron beam over an area of said storage surface having an extent which is proportional to the amplitude of said pulse, means for measuring the magnitude of said store area comprising a second circuit connected to said storage tube deflecting means to deflect the electron beam for a sweep duration greatly in excess of the deflection period produced by said first circuit to scan an area on said surface congruent with said store area and greater than the extent of said store area to create a phosphor potential discontinuity manifestable as a signal on said pick-up electrode, means for detecting said signal, means for providing a sequence of time-calibrated signals occurring over an interval extending from the commencement of said reading sweep, and means cooperating with said detecting means and said last-named means for correlating the rate of deflection of the electron beam during said reading sweep with said time-calibrated signals.

6. A pulse height analyzer comprising an electron beam storage tube of the type including a phosphor storage surface, beam-deflecting means and a pick-up electrode, a primary circuit for applying a pulse to be analyzed to the beam deflection means to deflect the electron beam over an area of the storage surface having an extent which is proportional to the amplitude of said pulse, a secondary deflection circuit connected to said storage tube deflecting means, means for applying a triggering pulse to the input of said secondary circuit concurrently with the application of the pulse to be analyzed to produce a subsequent deflection of said electron beam over an area on said surface congruent with said first-mentioned area and greater than the extent of said area to create a phosphor potential discontinuity manifestable as a signal on said pick-up electrode, and means for detecting said signal as a function of the time period measured from the initiation of said reading sweep.

7. A pulse height analyzer comprising an electron beam storage tube including a beam deflecting means, a charge-storing phosphor surface and a pick-up electrode, means for storing the pulse to be analyzed on said storage surface as a charged area the extent of which is proportional to the amplitude of said pulse, means for measuring the magnitude of said store area comprising means for deflecting said electron beam over an area of said surface congruent with said store area and greater than the extent of said store area to create a phosphor potential discontinuity manifestable as a signal on said pick-up electrode, means for detecting said signal, means for providing a sequence of time-calibrated signals occurring over an interval extending from the commencement of said reading sweep, means connected to said electron beam deflecting means and to said time-calibrated signal means for concurrently applying a triggering pulse thereto and coincidence means actuated by said detecting means and energizable by said sequentially occurring time-calibrated signals to deliver a signal output upon concurrence therebetween.

8. A pulse-height analyzer according to the structure defined in claim 7, in which said signal detecting means includes a coincidence gate and means are provided for connecting said triggering pulse to said coincidence circuit.

9. A pulse-height analyzer according to the structure defined in claim 7 in which said triggering pulse-applying means includes a delay circuit for initiating said beam deflecting and time-calibrated signal providing means concurrently at a period occurring after the time of application of the pulse to be analyzed.

10. A pulse-height analyzer according to claim 9 in which said signal detecting means includes a coincidence gate and means are provided for applying said delayed-triggering pulse to said coincidence gate.

11. A pulse-height analyzer comprising an electron beam storage tube including a beam-deflecting means, a charge-storing phosphor surface and a pick-up electrode, means for storing pulses to be analyzed on said storage surface as charged discrete areas, each having an extent proportional to the amplitude of each pulse respectively, means for measuring the magnitudes of said store areas comprising means for deflecting said electron beam over an area on said surface congruent with each of said discrete store area and greater than the extent thereof to create phosphor potential discontinuities commensurate with each of said store areas manifestable as distinct separately occurring signals on said pick-up electrode, means for detecting said signals as they occur and means for representing said detected signals as a function of the time period measured from the initiation of said reading sweep.

12. A pulse-height analyzer in accordance with the structure defined in claim 11 in which said signal-representing means comprises a time-calibration circuit providing time sequence periodic output signals, means for activating said time-calibration circuit concurrently with initiation of said reading sweep, and coincidence means connected to said detecting means and energizable only upon concurrence of one of said time signals and the output of said detecting means.

References Cited in the file of this patent
UNITED STATES PATENTS

| | | |
|---|---|---|
| 2,656,524 | Gridley et al. | Oct. 20, 1953 |
| 2,684,474 | Kass | July 20, 1954 |